US011382266B2

(12) United States Patent
Anderson et al.

(10) Patent No.: US 11,382,266 B2
(45) Date of Patent: Jul. 12, 2022

(54) SYSTEM AND METHOD FOR MONITORING THE PERFORMANCE OF ROTATING GROUND ENGAGING COMPONENTS OF AN AGRICULTURAL IMPLEMENT BASED ON THE ROTATIONAL SPEEDS OF SUCH COMPONENTS

(71) Applicant: CNH Industrial America LLC, New Holland, PA (US)

(72) Inventors: Brian J. Anderson, Yorkville, IL (US); Trevor Stanhope, Darien, IL (US); Christopher Schoeny, Yorkville, IL (US)

(73) Assignee: CNH Industrial America LLC, New Holland, PA (US)

( * ) Notice: Subject to any disclaimer, the term of this patent is extended or adjusted under 35 U.S.C. 154(b) by 830 days.

(21) Appl. No.: 16/154,126

(22) Filed: Oct. 8, 2018

(65) Prior Publication Data

US 2020/0107498 A1 Apr. 9, 2020

(51) Int. Cl.
*A01D 41/127* (2006.01)
*A01C 7/06* (2006.01)
(Continued)

(52) U.S. Cl.
CPC ............ *A01D 41/127* (2013.01); *A01C 5/064* (2013.01); *A01C 7/06* (2013.01); *A01C 7/203* (2013.01); *A01B 79/005* (2013.01)

(58) Field of Classification Search
CPC ......... A01B 79/005; A01C 5/064; A01C 7/06; A01C 7/203; A01D 41/127
See application file for complete search history.

(56) References Cited

U.S. PATENT DOCUMENTS 4,085,862 A 4/1978 Steffen
4,548,027 A * 10/1985 Maeoka ............... A01D 41/127
 56/10.2 G
(Continued)

FOREIGN PATENT DOCUMENTS

WO WO2018020310 A1 2/2018

OTHER PUBLICATIONS

Murray, Modelling of Soil-Tool Interactions Using the Discrete Element Method (DEM), Department of Biosystems Engineering, University of Manitoba, Winnipeg, 2016, 78 pages. https://mspace.lib.umanitoba.ca/bitstream/handle/1993/31735/Murray_Steven.pdf?sequence=1.

*Primary Examiner* — Charles J Han
(74) *Attorney, Agent, or Firm* — Rebecca L. Henkel; Rickard K. DeMille (57) ABSTRACT

In one aspect, a system for monitoring the performance of ground engaging components of an agricultural implement may include a ground engaging component configured to rotate relative to soil within a field as the agricultural implement is moved across the field. The system may also include a sensor configured to detect a parameter indicative of a rotational speed of the ground engaging component. Furthermore, the system may include a controller communicatively coupled to the sensor. The controller may be configured to monitor the rotational speed of the ground engaging component based on measurement signals received from the sensor and compare the monitored rotational speed to a baseline rotational speed value. Additionally, the controller may be configured to initiate a control action when it is determined that the monitored rotational speed has crossed the baseline rotational speed value a threshold number of times during a given time interval.

16 Claims, 5 Drawing Sheets

(51) Int. Cl.
    *A01C 5/06*         (2006.01)
    *A01C 7/20*         (2006.01)
    *A01B 79/00*      (2006.01)

(56) References Cited

U.S. PATENT DOCUMENTS

| | | |
|---|---|---|
| 6,070,539 A | 6/2000 | Flamme et al. |
| 6,374,153 B1 | 4/2002 | Brandt et al. |
| 6,438,506 B1 | 8/2002 | Yohpe et al. |
| 6,863,006 B2 | 3/2005 | Sandoval et al. |
| 8,326,500 B2 | 12/2012 | Mariman et al. |
| 8,408,149 B2 | 4/2013 | Rylander |
| 8,585,543 B1 | 11/2013 | Davis et al. |
| 8,907,596 B2 | 12/2014 | Harris, III et al. |
| 8,948,977 B2 | 2/2015 | Liu et al. |
| 9,485,900 B2 | 11/2016 | Connell et al. |
| 9,845,008 B2 | 12/2017 | Brownell et al. |
| 9,883,626 B2 | 2/2018 | Heim et al. |
| 2016/0088787 A1* | 3/2016 | Connell ................ A01B 76/00 701/50 |
| 2017/0022686 A1 | 1/2017 | Farmer et al. |

* cited by examiner

SYSTEM AND METHOD FOR MONITORING THE PERFORMANCE OF ROTATING GROUND ENGAGING COMPONENTS OF AN AGRICULTURAL IMPLEMENT BASED ON THE ROTATIONAL SPEEDS OF SUCH COMPONENTS

FIELD OF THE INVENTION

The present disclosure generally relates to agricultural implements and, more particularly, to systems and methods for monitoring the performance of rotating ground engaging components of an agricultural implement based on the rotational speeds of such components.

BACKGROUND OF THE INVENTION

Modern farming practices strive to increase yields of agricultural fields. In this respect, certain agricultural implements, such as seed-planting implements, are towed behind a tractor or other work vehicle to disperse seed throughout a field. A seed-planting implement typically includes one or more rotating ground engaging components configured to rotate or roll relative to the soil as the implement is moved across a field. For example, in certain configurations, the implement may include one or more disc openers that form a furrow or trench within the soil while rotating relative to the soil. Furthermore, the implement may also include one or more closing discs that close the furrow while rotating relative to the soil. In this regard, the function(s) of the rotating ground engaging component(s) requires or relies upon rotation of the component(s) relative to the soil. As such, the rotational speed(s) of the rotating ground engaging component(s) may be indicative of the performance of such component(s).

Accordingly, an improved system and method for monitoring the performance of rotating ground engaging components of an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for monitoring the performance of ground engaging components of an agricultural implement. The system may include a ground engaging component configured to rotate relative to soil within a field as the agricultural implement is moved across the field. The system may also include a sensor configured to detect a parameter indicative of a rotational speed of the ground engaging component. Furthermore, the system may include a controller communicatively coupled to the sensor. The controller may be configured to monitor the rotational speed of the ground engaging component based on measurement signals received from the sensor and compare the monitored rotational speed to a baseline rotational speed value. Additionally, the controller may be configured to initiate a control action when it is determined that the monitored rotational speed has crossed the baseline rotational speed value a threshold number of times during a given time interval.

In another aspect, the present subject matter is directed to a system for monitoring the performance of ground engaging components of an agricultural implement. The system may include a ground engaging component configured to rotate relative to soil within a field as the agricultural implement is moved across the field. The system may also include a sensor configured to detect a parameter indicative of a rotational speed of the ground engaging component. Furthermore, the system may include a controller communicatively coupled to the sensor. The controller may be configured to monitor the acceleration of the ground engaging component based on measurement signals received from the sensor. Additionally, the controller may be configured to initiate the control action when it is determined that an acceleration of the ground engaging component has exceeded a predetermined maximum acceleration threshold.

In a further aspect, the present subject matter is directed to a method for monitoring the performance of ground engaging components of an agricultural implement. The method may include controlling, with a computing device, an operation of the agricultural implement as the agricultural implement is moved across a field. As such, a ground engaging component of the agricultural implement may be configured to rotate relative to soil within the field as the agricultural implement is moved across the field. The method may also include monitoring, with a computing device, a rotational speed of the ground engaging component relative to a baseline rotational speed value. When the monitored rotational speed has crossed the baseline rotational speed value a threshold number of times during a given time interval, the method may further include initiating, with the computing device, a control action.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for monitoring the performance of rotating ground engaging components of an agricultural implement. Specifically, in several embodiments, as the implement is being moved across a field, a controller of the disclosed system may be configured to monitor the rotational speeds of one or more rotating ground engaging components of the implement, such as one or more gauge wheels, disc openers, closing discs, press wheels, or residue removal wheels, relative to a baseline rotational speed value. For instance, the performance of the rotating ground engaging component(s) may be poor or otherwise degraded when soil is not properly flowing around the component(s), such as when the component(s) is becoming "plugged" with soil and/or residue. In such instances, the monitored rotational speed(s) may cross the baseline rotational speed value several times in rapid succession. In one embodiment, the baseline rotational speed value may be a dynamically set value (e.g., determined based on the ground speed of the implement, the type of ground engaging component(s), and/or the soil conditions). As such, when the monitored rotational speed(s) of the rotating ground engaging component(s) crosses the baseline rotational speed value a threshold number of times during a given time interval, the controller may be configured to initiate a control action. Such control action may be associated with restoring the performance of the rotating ground engaging component(s). For example, in one embodiment, the control action may include adjusting one or more operating parameters of the implement, such as the downforce being applied to and/or the penetration depth of the rotating ground engaging component(s). In other embodiments, the control action may include providing a message or notification to another controller or the operator of the implement and/or providing an input to a field map.

Figure 1:
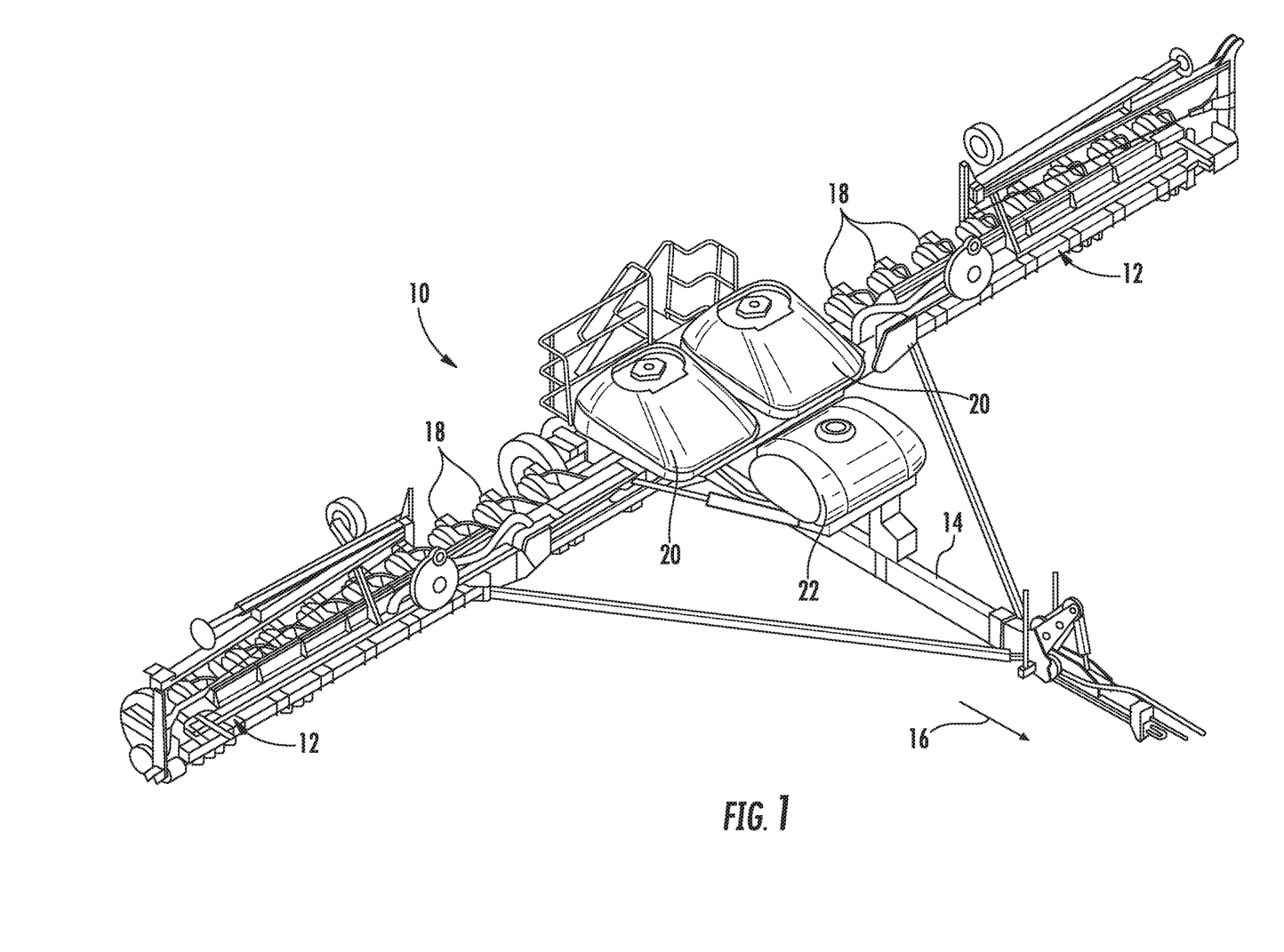
FIG. 1 illustrates a perspective view of one embodiment of an agricultural implement in accordance with aspects of the present subject matter.

Referring now to the drawings, FIG. 1 illustrates a perspective view of one embodiment of an agricultural implement 10 in accordance with aspects of the present subject matter. It should be appreciated that, although the implement 10 illustrated herein corresponds to a planter, the implement 10 may generally correspond to any suitable equipment or implement, such as a seeder (e.g., a seed disc drill) or another seed dispensing implement, a side dresser or another fertilizer dispensing implement, a strip tiller, a tillage implement (e.g., a disc harrow), and/or the like.

As shown in FIG. 1, the implement 10 may include a laterally extending toolbar or frame assembly 12 connected at its middle to a forwardly extending tow bar 14 to allow the implement 10 to be towed by a work vehicle (not shown), such as an agricultural tractor, in a direction of travel (e.g., as indicated by arrow 16 in FIG. 1). The toolbar 12 may generally be configured to support a plurality of seed planting units (or row units) 18. As is generally understood, each row unit 18 may be configured to deposit seeds at a desired depth beneath the soil surface and at a desired seed spacing as the implement 10 is being towed by the work vehicle, thereby establishing rows of planted seeds. In some embodiments, the bulk of the seeds to be planted may be stored in one or more hoppers or seed tanks 20. Thus, as seeds are planted by the row units 18, a pneumatic distribution system may distribute additional seeds from the seed tanks 20 to the individual row units 18. Additionally, one or more fluid tanks 22 may store agricultural fluids, such as insecticides, herbicides, fungicides, fertilizers, and/or the like.

It should be appreciated that, for purposes of illustration, only a portion of the row units 18 of the implement 10 have been shown in FIG. 1. In general, the implement 10 may include any number of row units 18, such as six, eight, twelve, sixteen, twenty-four, thirty-two, or thirty-six row units. In addition, it should be appreciated that the lateral spacing between row units 18 may be selected based on the type of crop being planted. For example, the row units 18 may be spaced approximately thirty inches from one another for planting corn, and approximately fifteen inches from one another for planting soybeans.

It should also be appreciated that the configuration of the agricultural implement 10 described above and shown in FIG. 1 is provided only to place the present subject matter in an exemplary field of use. Thus, it should be appreciated that the present subject matter may be readily adaptable to any manner of implement configuration.

Figure 2:
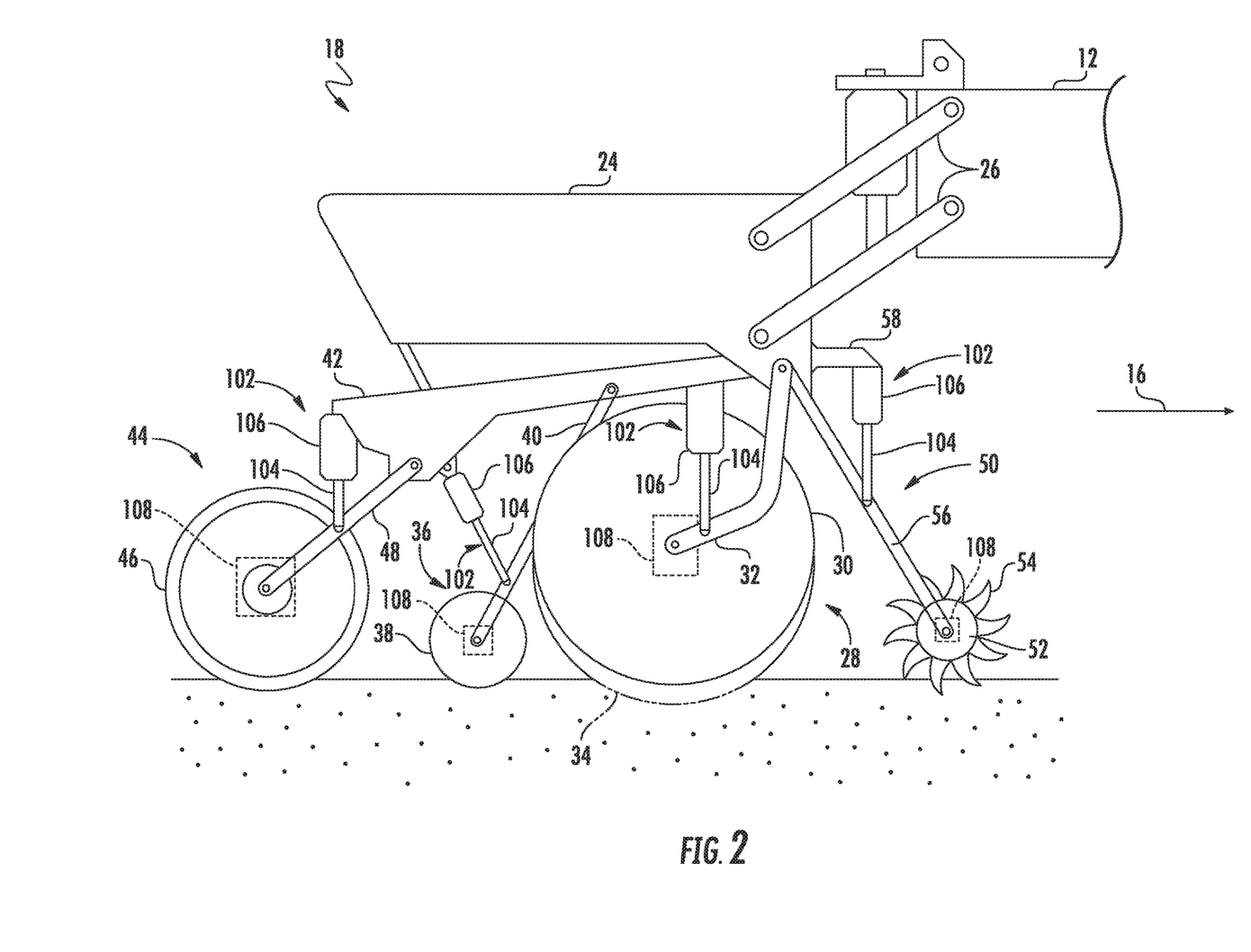
FIG. 2 illustrates a side view of one embodiment of a row unit suitable for use with an agricultural implement in accordance with aspects of the present subject matter.

Referring now to FIG. 2, a side view of one embodiment of a row unit 18 is illustrated in accordance with aspects of the present subject matter. As shown, the row unit 18 may include a frame 24 adjustably coupled to the toolbar 12 by links 26. For example, one end of each link 26 may be pivotably coupled to the frame 24, while an opposed end of each link 26 may be pivotably coupled to the toolbar 12. In one embodiment, the links 26 may be parallel. However, it should be appreciated that, in alternative embodiments, the row unit 18 may be coupled to the toolbar 12 in any other suitable manner. For example, the links 26 may be fixedly coupled to the frame 24 and/or the links 26 may be non-parallel. Additionally, in a further embodiment, the implement 10 may not include the links 26. In such instance, the implement 10 may include other components for coupling each row unit 18 to the toolbar 12.

As shown in FIG. 2, the row unit 18 also includes a furrow opening assembly 28. For example, in one embodiment, the furrow opening assembly 28 may include a gauge wheel 30 and one or more disc openers 34 configured to excavate a furrow or trench in the soil. As is generally understood, the gauge wheel 30 may be configured to engage the top surface of the soil as the implement 10 is moved across the field. In this regard, the height of the disc opener(s) 34 may be adjusted with respect to the position of the gauge wheel 30 to set the desired depth of the furrow being excavated. Furthermore, the furrow opening assembly 28 may include a support arm 32 configured to adjustably couple the gauge wheel 30 and the disc opener(s) 34 to the frame assembly 24. For example, one end of the support arm 32 may be pivotably coupled to the gauge wheel 30 and the disc opener(s) 34, while an opposed end of the support arm 32 may be pivotably coupled to the frame 24. However, it should be appreciated that, in alternative embodiments, the gauge wheel 30 and the disc opener(s) 34 may be coupled to the frame 24 in any other suitable manner.

Moreover, as shown, the row unit 18 may include a furrow closing assembly 36. Specifically, in several embodiments, the furrow closing assembly 36 may include a pair of closing discs 38 (only of which is shown) positioned relative to each other in a manner that permits soil to flow between the discs 38 as the implement 10 is being moved across the field. As such, the closing discs 38 may be configured to close the furrow after seeds have been deposited therein, such as by pushing the excavated soil into the furrow. Furthermore, the furrow closing assembly 36 may include a support arm 40 configured to adjustably couple the closing discs 38 to the frame assembly 24. For example, one end of the support arm 40 may be pivotably coupled to the closing discs 38, while an opposed end of the support arm 40 may be pivotably coupled to a chassis arm 42, which is, in turn, coupled to the frame 24. However, it should be appreciated that, in alternative embodiments, the closing discs 38 may be coupled to the frame 24 in any other suitable manner. Furthermore, it should be appreciated that, in alternative embodiments, the furrow closing assembly 36 may include any other suitable number of closing discs 38, such as one closing disc 38 or three or more closing discs 38.

Additionally, the row unit 18 may include a press wheel assembly 44. Specifically, in several embodiments, the press wheel assembly 44 may include a press wheel 46 configured to roll over the closed furrow to firm the soil over the seed and promote favorable seed-to-soil contact. Furthermore, the press wheel assembly 44 may include a support arm 48 configured to adjustably couple the press wheel 46 to the frame assembly 24. For example, one end of the support arm 48 may be pivotably coupled to the press wheel 48, while an opposed end of the support arm 48 may be pivotably coupled to the chassis arm 42, which is, in turn, coupled to the frame 24. However, it should be appreciated that, in alternative embodiments, the press wheel 46 may be coupled to the frame 24 in any other suitable manner.

Furthermore, in one embodiment, a residue removal device 50 may be positioned at the forward end of the row unit 18 relative to the direction of travel 16. In this regard, the residue removal device 50 may be configured to break up and/or sweep away residue, dirt clods, and/or the like from the path of the row unit 18 before the furrow is formed in the soil. For example, in one embodiment, the residue removal device 50 may include one or more residue removal wheels 52, with each wheel 52 having a plurality of tillage points or fingers 54. As such, the wheel(s) 52 may be configured to roll relative to the soil as the implement 10 is moved across the field such that the fingers 54 break up and/or sweep away residue and dirt clods. Additionally, the residue removal device 50 may include a support arm 56 configured to adjustably couple the residue removal wheel(s) 52 to the frame assembly 24. For example, one end of the support arm 56 may be pivotably coupled to the wheel(s) 52, while an opposed end of the support arm 56 may be pivotably coupled to the frame 24. However, it should be appreciated that, in alternative embodiments, the residue removal wheel(s) 52 may be coupled to the frame 24 in any other suitable manner. Furthermore, although only one residue removal wheel 52 is shown in FIG. 2, it should be appreciated that, in alternative embodiments, the residue removal device 50 may include any other suitable number of residue removal wheels 52. For example, in one embodiment, the residue removal device 50 may include a pair of residue removal wheels 52.

In several embodiments, the row unit 18 may include one or more actuators 102. Specifically, each actuator 102 may be configured to adjust to the position of a rotating ground engaging component of the row unit 18 relative to the frame 24. As used herein, a rotating ground engaging component may be any component of the implement 10 configured to rotate relative to the soil as the implement 10 is moved across a field. For example, in one embodiment, a first end of each actuator 102 (e.g., a rod 104 of each actuator 102) may be coupled to an arm on which the rotating ground engaging component is mounted, while a second end of each actuator 102 (e.g., the cylinder 106 of each actuator 102) may be coupled to the chassis arm 42 or a bracket 58, which are, in turn, coupled to the frame 24. The rod 104 of each actuator 102 may be configured to extend and/or retract relative to the corresponding cylinder 106 to adjust the downforce being applied to and/or the penetration depth of the associated rotating ground engaging component. In one embodiment, the actuator(s) 102 corresponds to a fluid-driven actuator(s), such as a hydraulic or pneumatic cylinder(s). However, it should be appreciated that the actuator(s) 102 may correspond to any other suitable type of actuator(s), such as an electric linear actuator(s). Furthermore, it should be appreciated that, in alternative embodiments, the actuator(s) 102 may be configured to adjust to the position(s) of any other rotating ground engaging component(s) of the row unit 18, such as the disc opener(s) 34.

As shown in FIG. 2, the actuator(s) 102 may be configured to adjust the downforce being applied to and/or the penetration depth of any number of rotating ground engaging components of the row unit 18. Specifically, in several embodiments, the actuator(s) 102 may configured to adjust the downforce being applied to one or more rotating ground engaging components of the furrow opening assembly 28, the furrow closing assembly 36, the press wheel assembly 44, and/or the residue removal device 50. For instance, as shown in the illustrated embodiment, an actuator 102 may configured to adjust the downforce being applied to the gauge wheel 30, the closing disc(s) 38, the press wheel 46, and the residue removal wheel(s) 52. Furthermore, in the illustrated embodiment, the actuators 102 may configured to adjust the penetration depth of the closing disc(s) 38. Alternatively, the actuator(s) 102 may be provided in operative association with any other suitable rotating ground engaging components of the row unit 18, such as the disc opener(s) 34.

Moreover, in several embodiments, the row unit 18 may include one or more rotational speed sensors 108. Specifically, each rotational speed sensor 108 may be configured to detect a parameter associated with the rotational speed of an associated rotating ground engaging component of the row unit 18. For example, in one embodiment, each rotational speed sensor 108 may be configured as a Hall Effect sensor configured to detect the rotational speed of the associated rotating ground engaging component. However, it should be appreciated that, in alternative embodiments, the rotational speed sensor(s) 108 may be configured as any other suitable device(s) for sensing or detecting the rotational speed(s) or position(s) of the one or more rotating ground engaging component(s) of the row unit 18.

Furthermore, as shown in FIG. 2, the rotational speed sensor(s) 108 may be provided in operative association with any number of rotating ground engaging components of the row unit 18. Specifically, in several embodiments, the rotational speed sensor(s) 108 may be provided in operative association with one or more rotating ground engaging components of the furrow opening assembly 28, the furrow closing assembly 36, the press wheel assembly 44, and/or the residue removal device 50. For instance, as shown in the illustrated embodiment, a rotational speed sensor 108 may be provided in operative association with the gauge wheel 30, one of the closing discs 38, the press wheel 46, and one of the residue removal wheels 52. Alternatively, the rotational speed sensor(s) 108 may be provided in operative association with any other suitable rotating ground engaging components of the row unit 18, such as the disc opener(s) 34, additional closing discs 38 or residue removal wheels 52, closing wheels (not shown), fertilizer coulters (not shown), and/or the like. Furthermore, in embodiments in which the implement 10 is configured as a tillage implement, the rotational speed sensor(s) 108 may be provided in operative association with any suitable discs, coulters, closing wheels, and/or the like.

It should be appreciated that the configuration of the row unit 18 described above and shown in FIG. 2 is provided only to place the present subject matter in an exemplary field of use. Thus, it should be appreciated that the present subject matter may be readily adaptable to any manner of row unit configuration.

Figure 3:
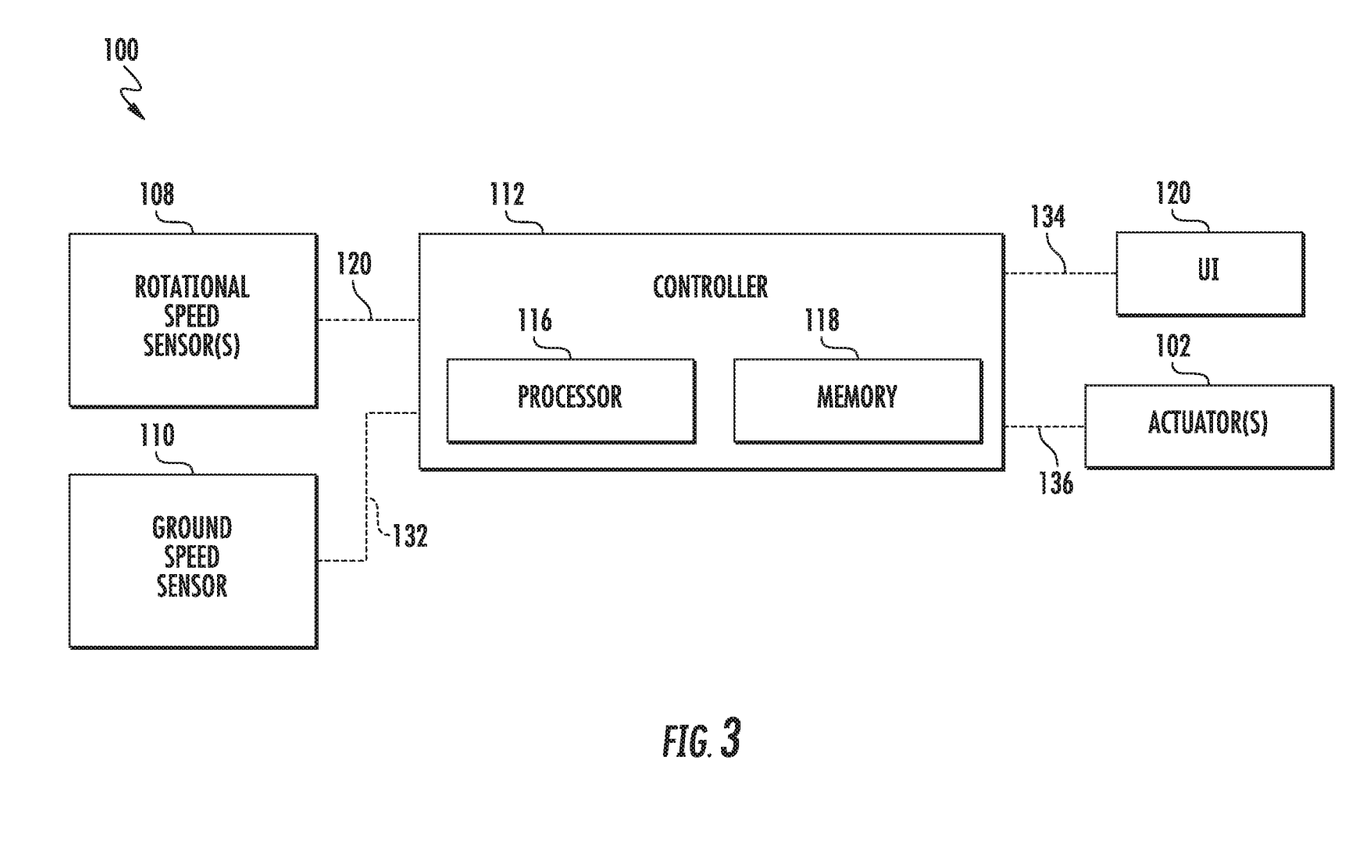
FIG. 3 illustrates a schematic view of one embodiment of a system for monitoring the performance of ground engaging components of an agricultural implement in accordance with aspects of the present subject matter.

Referring now to FIG. 3, a schematic view of one embodiment of a system 100 for monitoring the performance of ground engaging components of an agricultural implement is illustrated in accordance with aspects of the present subject matter. In general, the system 100 will be described herein with reference to the implement 10 and the row unit 18 described above with reference to FIGS. 1 and 2. However, it should be appreciated by those of ordinary skill in the art that the disclosed system 100 may generally be utilized with agricultural implements having any other suitable implement configuration and/or row units having any other suitable row unit configuration.

As shown in FIG. 3, the system 100 may include a ground speed sensor 110 configured to detect a parameter associated with the ground speed at which the implement 10 is being moved across the field. As such, the speed sensor 110 may be provided in operative association with the implement 10 or an associated work vehicle (not shown). For example, in one embodiment, the speed sensor 110 may be configured as a Hall Effect sensor configured to detect the rotational speed of an output shaft of a transmission of the work vehicle. However, it should be appreciated that, in alternative embodiments, the speed sensor 110 may be configured as any other suitable device for sensing or detecting the speed of the implement 10.

In accordance with aspects of the present subject matter, the system 100 may include a controller 112 configured to electronically control the operation of one or more components of the implement 10. In general, the controller 112 may comprise any suitable processor-based device known in the art, such as a computing device or any suitable combination of computing devices. Thus, in several embodiments, the controller 112 may include one or more processor(s) 114 and associated memory device(s) 116 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 116 of the controller 112 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 116 may generally be configured to store suitable computer-readable instructions that, when implemented by the processor(s) 114, configure the controller 112 to perform various computer-implemented functions, such as one or more aspects of the method 200 described below with reference to FIG. 5. In addition, the controller 112 may also include various other suitable components, such as a communications circuit or module, one or more input/output channels, a data/control bus and/or the like.

It should be appreciated that the controller 112 may correspond to an existing controller of the implement 10 or an associated work vehicle (not shown) or the controller 112 may correspond to a separate processing device. For instance, in one embodiment, the controller 112 may form all or part of a separate plug-in module that may be installed within the implement 10 or associated work vehicle to allow for the disclosed system and method to be implemented without requiring additional software to be uploaded onto existing control devices of the implement 10 or the associated work vehicle.

Furthermore, in one embodiment, the system 100 may also include a user interface 118. More specifically, the user interface 118 may be configured to provide feedback (e.g., notifications associated with the performance of the rotating ground engaging components of the implement 10) to the operator of the implement 10. As such, the user interface 118 may include one or more feedback devices (not shown), such as display screens, speakers, warning lights, and/or the like, which are configured to communicate such feedback. In addition, some embodiments of the user interface 118 may include one or more input devices (not shown), such as touchscreens, keypads, touchpads, knobs, buttons, sliders, switches, mice, microphones, and/or the like, which are configured to receive user inputs from the operator. In one embodiment, the user interface 118 may be positioned within a cab of a work vehicle configured to tow the implement 10 across the field. However, in alternative embodiments, the user interface 118 may have any suitable configuration and/or be positioned in any other suitable location.

In several embodiments, the controller 112 may be configured to monitor the rotational speeds and/or the accelerations of one or more rotating ground engaging components of the implement 10, such as the gauge wheel 30, the disc opener(s) 34, the closing disc(s) 38, the press wheel 46, and/or the residue removal wheel(s) 52. Specifically, as shown in FIG. 3, the controller 112 may be communicatively coupled to a rotational speed sensor(s) 108 via wired or wireless connection to allow measurement signals (e.g., as indicated by dashed lines 120 in FIG. 3) to be transmitted from the rotational speed sensor(s) 108 to the controller 112. As such, the controller 112 may be configured to monitor the rotational speed(s) and/or acceleration(s) of the rotating ground engaging component(s) based on the received measurement signals 120. For instance, the controller 112 may include a look-up table, suitable mathematical formula, and/or algorithms stored within its memory 116 that correlates the received measurement signals 120 to the rotational speed(s) and/or acceleration(s) of the rotating ground engaging component(s).

Furthermore, in several embodiments, the controller 112 may be configured to initiate a control action when the monitored rotational speed(s) has crossed one or more baseline rotational speed values a threshold number of times during a given time interval. More specifically, the monitored rotation speed(s) of the rotating ground engaging component(s) may be erratic when the performance of such component(s) has become poor or otherwise degraded. For example, the monitored rotational speed(s) of the rotating ground engaging component(s) may increase and decrease in rapid succession when the soil is not properly flowing around the component(s), such as when the component(s) is becoming "plugged" with soil and/or residue. Furthermore, the periodicity of this behavior may slow as soil and/or residue accumulation worsens (i.e., the rotating ground engaging component(s) become "more" plugged). In this regard, the controller 112 may be configured to determine when the monitored rotational speed(s) crosses the baseline rotational speed value(s). It should be appreciated that the baseline rotational speed value(s) may be a rotational speed value(s) that differs from a target or expected rotational speed value(s) of the rotating ground engaging component(s). For example, in one embodiment, the baseline rotational speed value(s) may be less than the target rotational speed value(s). Furthermore, the baseline rotational speed(s) may be set at a level at which it is expected or anticipated that the monitored rotational speed(s) of the rotating ground engaging component(s) will cross the baseline rotational speed(s) several times in rapid succession when the performance of the component(s) is degrading. As such, the controller 112 monitors the frequency of oscillations as the oscillations degrades due to accumulation of plugging materials (stick overcomes slip). Thereafter, in the event that the monitored rotational speed(s) has crossed the baseline rotational speed value(s) a threshold number of times during a given time interval (thereby indicating that the performance of the rotating ground engaging component(s) is becoming degraded), the controller 112 may be configured to initiate one or more control actions. It should be appreciated that the monitored rotational speed(s) may be considered to have crossed the baseline rotational speed value(s) the threshold number of times during the given time interval when the number of times deviates (i.e., is greater or less than) from an expected number of times. Furthermore, it should be appreciated that, in alternative embodiments, the one or more baseline rotational speed values may include an upper baseline rotational speed value and a lower baseline speed value such that a baseline rotational speed range is defined. In such embodiment, the controller 112 may be configured to initiate the control action when the monitored rotational speed(s) has crossed upper and lower baseline rotational speed values the threshold number of times during the given time interval.

Figure 4:
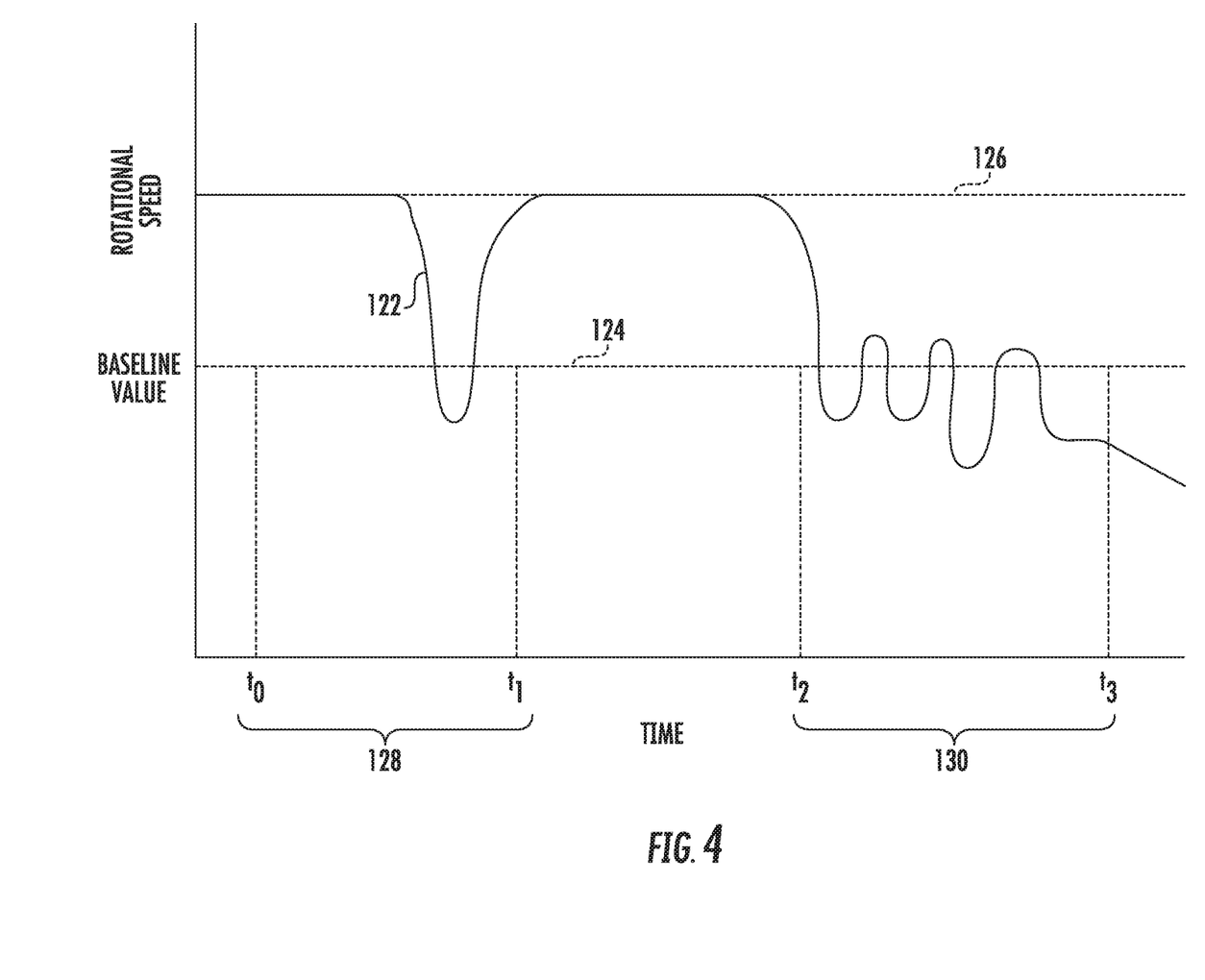
FIG. 4 illustrates a graphical view of an example dataset charting the rotational speed of a ground engaging component of an agricultural implement over time in accordance with aspects of the present subject matter.

For instance, FIG. 4 illustrates a graphical view of an example dataset charting the rotational speed of one of the rotating ground engaging components of the implement 10 (e.g., as indicated by solid line 122 in FIG. 4) relative to an associated baseline rotational speed value (e.g., as indicated by dashed lined 124 in FIG. 4) over time as monitored by the controller 112. As shown in FIG. 4, during various different time periods, the rotational speed 122 of the rotating ground engaging component differs from its target rotational speed 126, such as during a first time period 128 between time to and time $t_1$ and during a second time period 130 between time $t_2$ and time $t_3$. In such instances, the controller 112 may be configured to identify when the rotational speed 126 crosses the baseline rotational speed value 124. As indicated above, in the event that the number of times that the rotational speed 126 crosses a baseline rotational speed value 124 during a given time period exceeds the threshold number of times, the controller 112 may be configured to initiate a control action(s) intended to reduce any performance degradation associated with the varying speed data. For instance, in the example dataset of FIG. 4, it may be assumed that the number of times that the rotational speed 122 crosses the baseline rotational speed value 124 during the first time period 128 is less than the threshold number of times. In such instance, the rotating ground engaging component may have encountered an isolated field condition not associated with any degradation of the performance of the component, such as a rock. Conversely, it may be assumed that the number of times that the rotational speed 122 crosses the baseline rotational speed value 124 during the second time period 130 is greater than the threshold number of times. In such instance, the rapid variation in the speed data may indicate that the performance of the rotating ground engaging component is degrading or already degraded, such as when the component is becoming "plugged" with soil and/or residue.

It should be appreciated that the threshold number of times utilized by the controller 112 may generally be selected to prevent contact with isolated field conditions (e.g., rocks or other impediments) from triggering the control action(s). For instance, in one embodiment, the threshold number may be greater than three times, such as four times, five times, or six times.

Furthermore, it should be appreciated that the given time period utilized by the controller 112 may generally be selected to prevent sporadic contact with isolated field conditions (e.g., rocks or other impediments) from triggering the control action(s). For instance, in one embodiment, the given time period may be less than three seconds, such as two seconds, one second, or half of a second.

In several embodiments, the baseline rotational speed value(s) may be dynamically set. Specifically, in one embodiment, the baseline rotational speed value(s) may set based on the ground speed of the implement 10. Specifically, as shown in FIG. 3, the controller 112 may be communicatively coupled to the ground speed sensor 110 via a wired or wireless connection to allow measurement signals (e.g., as indicated by dashed lines 132 in FIG. 3) to be transmitted from the ground speed sensor 110 to the controller 112. As such, the controller 112 may be configured to determine the ground speed at which the implement 10 is being moved across the field based on the received measurement signals 132. In this regard, the controller 112 may be configured to determine a target or expected, non-plugged rotational speed(s) of the rotating ground engaging component(s) based on the determined ground speed of the implement 10. For instance, the controller 112 may include a look-up table, suitable mathematical formula, and/or algorithms stored within its memory 116 that correlates the received measurement signals 120 to the target rotational speed(s) of the rotating ground engaging component(s). Thereafter, the controller 112 may be configured to set the baseline rotational speed value(s) based on the determine target rotational speed(s). For example, in one embodiment, the baseline value(s) may be a predetermined percentage of the target rotational speed(s), such as eighty percent, seventy percent, sixty percent, fifty percent, etc. In another embodiment, the controller 112 may be configured to determine or set the baseline rotational speed value(s) based on the type of rotating ground engaging component(s) (e.g., whether the rotating ground engaging component(s) corresponds to a disc opener, closing disc, press wheel, etc.). In a further embodiment, the controller 112 may be configured to determine or set the baseline rotational speed value(s) based on one or more soil parameters or conditions, such as soil hardness, soil moisture, and/or the like. However, it should be appreciated that, in alternative embodiments, the baseline rotational speed value(s) may be set or otherwise determined in any other suitable manner. Furthermore, in one embodiment, the baseline rotational speed value(s) may be predetermined static value(s).

Moreover, in one embodiment, the controller 112 may be configured to initiate one or more control actions when the monitored rotational acceleration(s) of the rotating ground engaging component(s) has exceeded one or more maximum acceleration threshold(s). More specifically, large rotational acceleration(s) of the rotating ground engaging component(s) may be indicative of degradation in the performance of the component(s), such as when a given component(s) is becoming "plugged." In this regard, the controller 112 may be configured to monitor the rotational acceleration(s) of the rotating ground engaging component(s) relative to the maximum acceleration threshold(s) based on the received measurement signals 120. The monitored accelerations may be positive (i.e., an increase in rotational speed) or negative (i.e., a decrease in rotational speed). For instance, the controller 112 may include a look-up table, suitable mathematical formula, and/or algorithms stored within its memory 116 that correlates the received measurement signals 120 to the rotational acceleration(s) of the rotating ground engaging component(s). The acceleration threshold(s) may be set or determined based on the ground speed of the implement 10 and/or the change in the ground of the implement 10. Thereafter, in the event that the monitored acceleration(s) has exceeded the acceleration threshold(s) (thereby indicating that the performance of the rotating ground engaging component(s) is becoming degraded), the controller 112 may be configured to initiate one or more control actions.

In one embodiment, the controller 112 may be configured to notify the operator of implement 10 that the monitored rotational speed(s) of the rotating ground engaging component(s) has crossed the baseline rotational speed value(s) the threshold number of times during a given time period and/or that the acceleration(s) of the component(s) has exceeded the predetermined maximum acceleration threshold(s). Specifically, in one embodiment, the controller 112 may be communicatively coupled to the user interface 118 via a wired or wireless connection to allow feedback signals (e.g., indicated by dashed line 134 in FIG. 3) to be transmitted from the controller 112 to the user interface 118. In such embodiment, the feedback signals 134 may instruct the user interface 118 to provide a notification to the operator of the implement 10 (e.g., by causing a visual or audible notification or indicator to be presented to the operator) that indicates that the monitored rotational speed(s) of the rotating ground engaging component(s) has crossed the baseline rotational speed value(s) the threshold number of times during a given time period and/or that the acceleration(s) of the component(s) has exceeded the predetermined maximum acceleration threshold(s). In such instances, the operator may then choose to initiate any suitable corrective action he/she believes is necessary, such as adjusting the downforce applied to and/or the penetration depth(s) of the associated rotating ground engaging component(s). Furthermore, the controller 112 may be configured to provide a performance parameter or percentage associated with the number of times the monitored rotational speed has crossed the baseline rotational speed value during the given time interval to the operator via the user interface 118 and/or the monitored acceleration. Additionally, the notification may be provided to another controller, such as a controller (not shown) of an associated work vehicle (not shown). In a further embodiment, such information or notification may be used in generating a field map.

Moreover, in several embodiments, the controller 112 may be configured to automatically adjust one or more operating parameters of the implement 10 when it is determined that the monitored rotational speed(s) of the rotating ground engaging component(s) has crossed the baseline rotational speed value(s) the threshold number of times during a given time period and/or the acceleration(s) of the component(s) has exceeded the predetermined maximum acceleration threshold(s). Specifically, as shown in FIG. 3, the controller 112 may be communicatively coupled to the actuator(s) 102 of the implement 10 via a wired or wireless connection to allow control signals 136 to be transmitted from the controller 112 to the actuator(s) 102. As such, the controller 112 may be configured to transmit control signals 122 to the actuator(s) 102 instructing the actuator(s) 102 to adjust the downforce being applied to and/or penetration depth(s) of the associated rotating ground engaging component(s), such as by extending or retracting the corresponding rod(s) 104 relative to the corresponding cylinder(s) 106.

Figure 5:
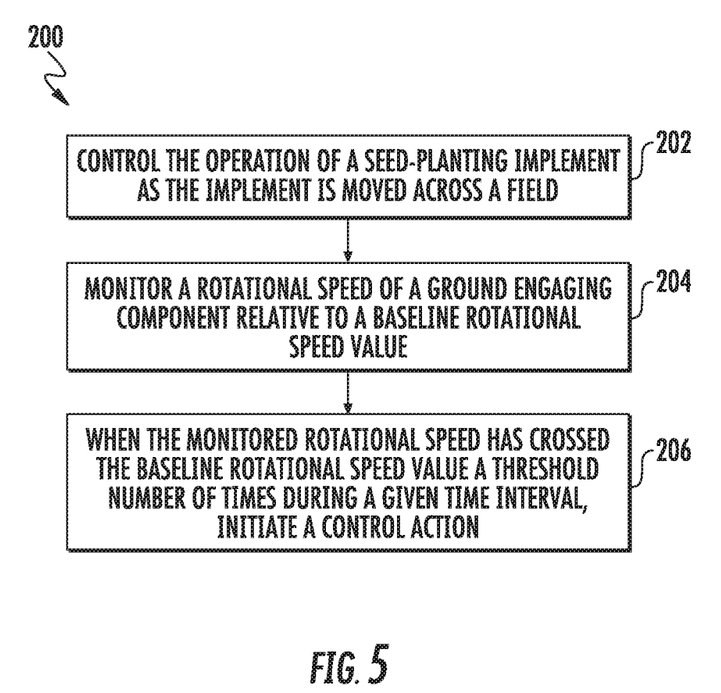
FIG. 5 illustrates a flow diagram of one embodiment of a method for monitoring the performance of ground engaging components of an agricultural implement in accordance with aspects of the present subject matter.

Referring now to FIG. 5, a flow diagram of one embodiment of a method 200 for monitoring the performance of ground engaging components of an agricultural implement is illustrated in accordance with aspects of the present subject matter. In general, the method 200 will be described herein with reference to the agricultural implement 10 and the system 100 described above with reference to FIGS. 1-4. However, it should be appreciated by those of ordinary skill in the art that the disclosed method 200 may generally be utilized to monitor the performance of ground engaging components of any agricultural implement having any suitable implement configuration and/or in connection with any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include controlling, with a computing device, the operation of an agricultural implement as the implement is moved across a field. For instance, as described above, a controller 112 may be configured to control the operation of one or more components of an agricultural implement 10 as the implement 10 is being moved across the field.

Additionally, at (204), the method 200 may include monitoring, with a computing device, a rotational speed of a ground engaging component of the agricultural implement relative to a baseline rotational speed value. For instance, as described above, the controller 112 may be communicatively coupled to one or more rotational speed sensors 108 provided in operative association with the rotating ground engaging component(s), such as the gauge wheel 30, the disc opener(s) 34, the closing disc(s) 38, the press wheel 46, and/or the residue removal wheel(s) 52. As such, when the implement 10 is being moved across the field, the controller 112 may be configured to monitor the rotational speed(s) of the rotating ground engaging component(s) based on measurement signals 120 received from the rotational speed sensor(s) 108.

Moreover, as shown in FIG. 5, at (206), the method 200 may include, when the monitored rotational speed has crossed the baseline rotational speed value a threshold number of times during a given time interval, initiating, with the computing device, a control action. For instance, as described above, when the monitored rotational speed has crossed the baseline rotational speed value a threshold number of times during a given time interval, the controller 112 may be configured to transmit control signals 136 to one or more actuator(s) 102 of the implement 10 to adjust one or more operating parameters of the rotating ground engaging component(s), such as the downforce being applied thereto and/or the penetration depth thereof.

It is to be understood that the steps of the method 200 are performed by the controller 112 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 112 described herein, such as the method 200, is implemented in software code or instructions which are tangibly stored on a tangible computer readable medium. The controller 112 loads the software code or instructions via a direct interface with the computer readable medium or via a wired and/or wireless network. Upon loading and executing such software code or instructions by the controller 112, the controller 112 may perform any of the functionality of the controller 112 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for monitoring the performance of ground engaging components of an agricultural implement, the system comprising:
    a ground engaging component configured to rotate relative to soil within a field as the agricultural implement is moved across the field;
    a sensor configured to detect a parameter indicative of a rotational speed of the ground engaging component; and
    a controller communicatively coupled to the sensor, the controller configured to:
    monitor the rotational speed of the ground engaging component based on measurement signals received from the sensor;
    determine when the monitored rotational speed has cycled above and below a baseline rotational speed value a threshold plurality of times during a given time interval; and
    initiate a control action when it is determined that the monitored rotational speed has cycled above and below the baseline rotational speed value the threshold plurality of times during the given time interval.

2. The system of claim 1, wherein the controller is further configured to initiate the control action when it is determined that an acceleration of the ground engaging component has exceeded a predetermined maximum acceleration threshold.

3. The system of claim 1, wherein the controller is further configured to monitor a ground speed at which the agricultural implement is being moved across the field and determine the baseline rotational speed value based on the monitored ground speed.

4. The system of claim 1, wherein the controller is further configured to determine the baseline rotational speed value based on a type of the ground engaging component or a soil parameter.

5. The system of claim 1, wherein the control action comprises at least one of notifying an operator of the agricultural implement that the monitored rotational speed has cycled above and below the baseline rotational speed value the threshold plurality of times during the given time interval.

6. The system of claim 1, wherein the control action comprises adjusting an operating parameter of the agricultural implement.

7. The system of claim 6, wherein the operating parameter comprises at least one of a downforce applied to or a penetration depth of the ground engaging component.

8. The system of claim 1, wherein the threshold plurality of times is at least three times.

9. The system of claim 1, wherein the given time interval is less than three seconds.

10. A method for monitoring the performance of ground engaging components of an agricultural implement, the method comprising:
    controlling, with a computing device, an operation of the agricultural implement as the agricultural implement is moved across a field, a ground engaging component of the agricultural implement configured to rotate relative to soil within the field as the agricultural implement is moved across the field;
    monitoring, with a computing device, a rotational speed of the ground engaging component relative to a baseline rotational speed value;
    determining, with the computing device, when the monitored rotational speed has cycled above and below a baseline rotational speed value a threshold plurality of times during a given time interval; and
    when the monitored rotational speed has cycled above and below the baseline rotational speed value the threshold plurality of times during the given time interval, initiating, with the computing device, a control action.

11. The method of claim 10, further comprising:
    when an acceleration of the ground engaging component has exceeded a predetermined maximum acceleration threshold, initiating, with the computing device, the control action.

12. The method of claim 10, further comprising:
    monitoring, with the computing device, a ground speed at which the agricultural implement is being moved across the field; and
    determining, with the computing device, the baseline rotational speed value based on the monitored ground speed.

13. The method of claim 10, further comprising:
determining, with the computing device, the baseline rotational speed value based on a type of the ground engaging component or a soil parameter.

14. The method of claim 10, wherein the control action comprises notifying an operator of the agricultural implement that the monitored rotational speed has cycled above and below the baseline rotational speed value the threshold plurality of times during the given time interval.

15. The method of claim 10, wherein the control action comprises adjusting an operating parameter of the agricultural implement.

16. The method of claim 15, wherein the operating parameter comprises at least one of a downforce applied to or a penetration depth of the ground engaging component.

* * * * *